3,182,487
TESTING FOR VOLUME OF SOLUBLE GASES
Frank O. Graham, 13965 Abington, Detroit, Mich.
Filed Aug. 3, 1962, Ser. No. 214,683
7 Claims. (Cl. 73—19)

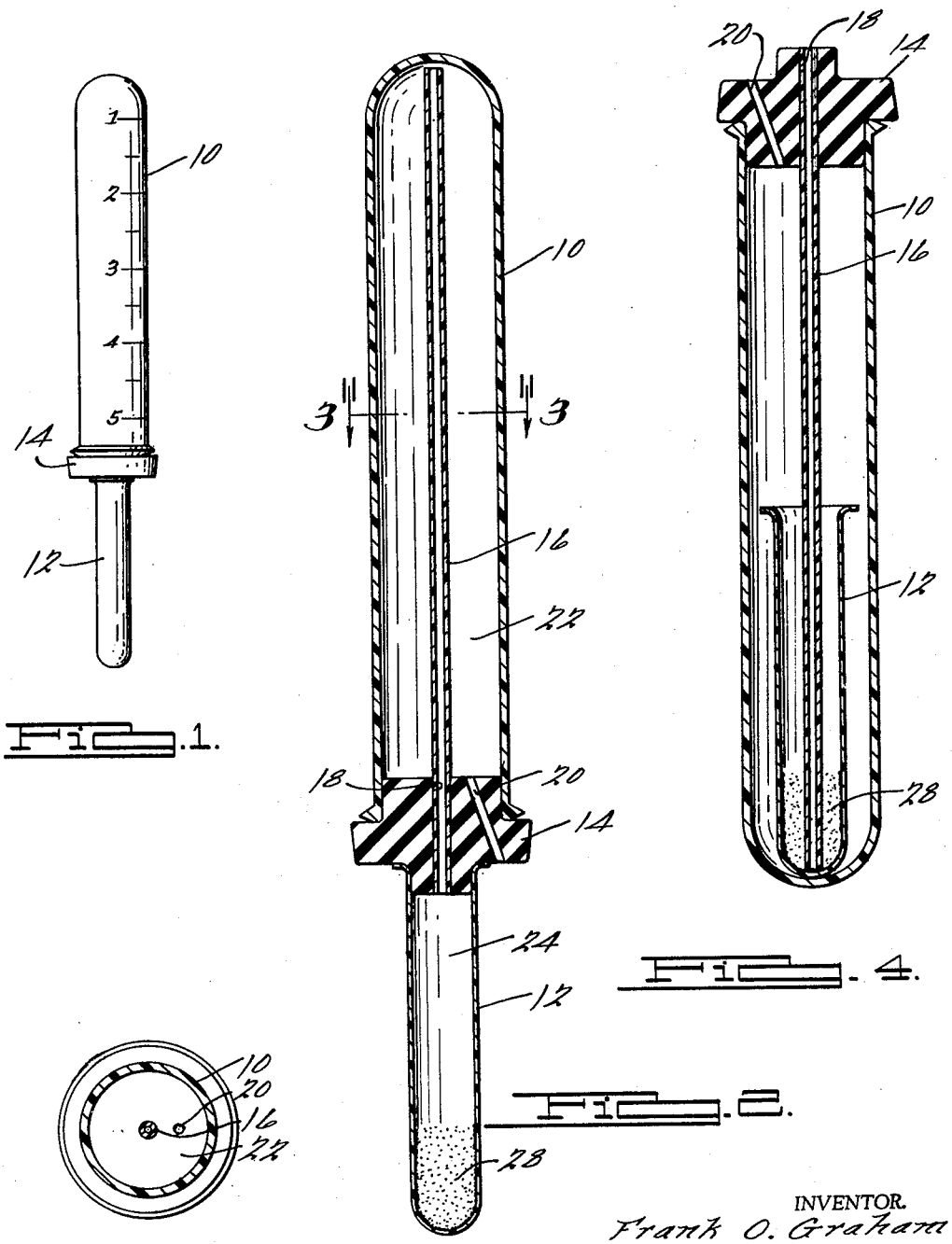

The present invention relates generally to testing apparatus for determining the volume of a soluble gas held in solution in a liquid. For exemplary purposes the invention and the teachings thereof will be described in connection with an apparatus which is particularly well suited for determining the volume of carbon dioxide ($CO_2$) absorbed in water, a test which is often performed to determine the carbonation of carbonated water or other carbonated beverages.

Since the palatability of a carbonated beverage depends to a great extent on its $CO_2$ gas content, it is very important that a close control over carbonation be maintained, in order to insure a uniformly satisfactory product. Conventionally the $CO_2$ gas content of carbonated beverages is determined in the field by the use of an apparatus into which a sample is placed and vigorously agitated to liberate the gas. The temperature of the sample and pressure of the liberated gas are then measured and by reference to a chart or scale the volumes of carbonation are determined. This conventional technique is not only laborious but is also subject to errors, primarily due to the inaccuracy of the pressure gauges and thermometers (they are usually of relatively inexpensive construction and are unable to withstand the rough handling to which they are subjected in the field), and the lack of skill of the operator in reading these instruments and interpreting the information obtained. This technique may also introduce a further error of an unpredictable and often appreciable amount due to the presence of air or water vapor, or a mixture of both, with the $CO_2$ gas, the pressure of which it is desired to determine. Since the pressure reading indicated by the pressure gauge is the sum of the partial pressures of the various gases involved, according to Dalton's law of partial pressures, any determination of the volumes of carbonation based on the pressure of the mixture will inherently be subject to serious errors. In addition, such conventional-type equipment is relatively complicated and expensive, inconvenient to carry, and very much subject to damage by careless use or handling.

It is therefore a primary object of this invention to provide a sturdy, compact, lightweight, and very inexpensive apparatus of novel construction for testing for volumes of soluble gases, particularly the volume of $CO_2$ gas in carbonated beverages, which apparatus is ideal for field testing and is not subject to the aforementioned disadvantages of conventional-type equipment.

Another object of this invention resides in the provision of a unique apparatus for the purpose described which is accurate, which does not require the use of an expensive and sensitive or delicate pressure measuring instrument, thereby removing the possibility of errors from this source, and which is simple and foolproof in operation, providing for the direct reading of volumes of carbonation. A related object concerns the provision of such an apparatus which will permanently retain its high degree of accuracy without the need for periodic calibration or repair.

These and other objects of the present invention will become apparent from consideration of the specification taken in conjunction with the accompanying drawings in which there is illustrated a single embodiment of the present invention, by way of example, and wherein:

FIGURE 1 is a side elevational view illustrating an apparatus embodying the principles of the present invention in an assembled operative condition;

FIGURE 2 is a similar view in section illustrating the details of construction of the apparatus;

FIGURE 3 is a sectional view taken along line 3—3 in FIGURE 2; and

FIGURE 4 is a view similar to FIGURE 2 illustrating the apparatus with the components thereof reassembled for convenient storage.

As can be seen, the assembled apparatus generally comprises a relatively large gas-collecting vessel 10, preferably tubular in form, having one end closed and the other end open, a relatively small test sample vessel 12, also preferably tubular in form, with one end closed and the other end open, a resilient stopper 14 forming a closure for the open end of the vessels 10 and 12, and a tubular conduit 16 of relatively small diameter secured within an axial opening 18 in stopper 14 for communicating gas liberated from the test sample within vessel 12 to the top of vessel 10. The gas-collecting chamber defined by vessel 10, conduit 16, and the stopper is indicated at 22. Integrally formed in stopper 14 is passageway 20 for communicating chamber 22 with the atmosphere.

The apparatus is illustrated in FIGURE 2 in its upright position, i.e., the position in which gas volume readings may be taken, and as can be seen, the upper end of conduit 16 terminates as close as possible to the closed end of vessel 10, and the lower end of conduit 16 is substantially flush with the relatively flat horizontal lower surface of the stopper. The relatively small volume test sample chamber defined by vessel 12 and the stopper is indicated at 24. To materially aid in the liberation of gas from the test sample, the lower end portion of vessel 12 may be roughened, such as by sand blasting or the like, as at 28 in FIGURE 4.

Each of the above-described components are preferably made from materials which will not be affected by water or carbon dioxide, or whatever liquids and gases are undergoing test. For example, the vessels and conduit may be formed of a suitable plastic material, such as polyethylene or the like, and the stopper of rubber or the like. The stopper is formed of such a shape and size, as well as material, that it will frictionally engage vessels 10 and 12 and conduit 16 in a fluid-tight connection. Vessel 10 is preferably made of a transparent or translucent material and has a volumeric capacity substantially greater than that of vessel 12.

In general, the apparatus functions in the following manner. Vessel 12 is filled with a sample of the gas-liquid solution to be tested, and vessel 10 is filled with a liquid, preferably water, over which the gas to be measured is collected, the displaceable liquid escaping to the atmosphere through passageway 20 as it is displaced. Conduit 16 provides for a free passage of the gas liberated from the test sample in vessel 12 to a point close to the upper closed end of vessel 10, above the surface of the displaceable liquid therein. This permits the collection of the liberated gas without the necessity of its having to bubble up through the column of the displaceable liquid which might tend to absorb a small amount of the gas, especially if the liquid is water and the gas $CO_2$, thus reducing the accuracy of the measurement. Passageway 20 is relatively small in diameter so as to prevent the escape of liquid from vessel 10 due solely to the action of gravity, but is sufficiently large to permit the displaced liquid to escape so that the collected gas will be maintained at atmospheric pressure.

As can be seen, vessel 10 is provided with indicia or graduations on the side wall thereof indicating increments of the volume of chamber 22, in order to obtain an indication of the volume of gas collected and hence the amount or volumes orginally in solution in the test sample. These graduations may be calibrated to read directly in volumes of soluble gas per volume of liquid test sample, such as volumes of carbonation, or may be arbitrary in nature, or may have the divisions thereof not referring to volumes but to acceptable or desirable limits of soluble gas. In any case, the graduations will bear a definite relationship to the volume of the test sample, i.e., the volume of chamber 24.

When graduations are provided on vessel 10 which are intended to indicate the volumes of gas, these graduations should be so positioned that each one-volume increment indicates an amount of liberated gas which, after applying the necessary pressure and temperature corrections, is exactly equal to the volume of the test sample; i.e., the volume of chamber 24. Since for all practical purposes the volume of the liquid portion of the solution is the same as the volume of the total solution (i.e., gas and liquid), one volume may be taken as the net volume of vessel 12 after insertion of stopper 14, i.e., the volume of chamber 24. In determining the positions of these graduations, consideration must be given to the fact that in actuality all of the gas originally contained in the test sample will not be liberated. This is because although it is contemplated that some heating of the test sample will be called for, as will be described, it is not contemplated that the temperature used will be sufficiently high to drive off all of the gas in solution. The amount of gas which will be retained in the test sample, however, may be accurately calculated for any given temperature using standard published data. Therefore, the graduation which represents one volume of gas per volume of the liquid test sample should be positioned so as to indicate a volume within vessel 10 equal to the actual amount of gas which could be liberated under test conditions from a sample originally containing one volume of gas; or in other words, indicate a volume within vessel 10 equal to the total amount of gas in a test sample containing one volume of gas, less the amount which is in fact retained by the test sample under test conditions.

In determining the amount of gas retained in the test sample at various test temperatures, reference may be made to published data on the subject. This data is generally based on 760 millimeters of mercury pressure so that it is also necessary to make a pressure correction to account for the pressure of the test sample, if it tested greater or less than 760 millimeters of mercury (i.e., an altitude correction), as well as for the partial pressure of the liquid vapor at the temperature at which the test is conducted. In other words, since the "volumes" of the gas or the coefficient of absorption is based on the gas being at 760 millimeters of mercury pressure and 0° C. (32° F.) temperature, it is necessary to apply corrections to the liberated gas both from the standpoint of its temperature and its pressure, the latter necessitating adjustment because it will likely be reduced by altitude above sea level and also because it will be reduced by the partial pressure of the liquid vapor of the sample at test temperature.

By making the above corrections and taking into account the displacement of gas conduit 16 within vessel 10 and the volume of the passageway therein, the exact location of the "1 volume" graduation on vessel 10 can readily be determined, for a given size apparatus, gas-liquid solution, and test temperature. The successive volume graduations may then be easily determined bearing in mind the necessary corrections just discussed.

If an arbitrary scale is employed on vessel 10, or when other markings are provided which only indicate acceptable or desirable limits of carbonation, then the apparatus is not intended to indicate the amount of gas in "volumes" but is to serve only as a means of testing to maintain the standards of carbonation specified for the make or kind of beverage in question. When these type markings are provided, calculations and corrections are not required to establish the various points on the scale.

Since a given soluble gas is known to have a relatively strong affinity for the liquid in which it is in solution, as well as the liquid over which it is to be collected (as where the gas is $CO_2$ and the displaceable liquid within vessel 10 water), particularly under conditions of increased pressure and reduced temperature, the present apparatus is designed to reduce the effect of this affinity upon the accuracy of the test results by minimizing the area of contact between liberated gas and the liquids involved, and by testing at atmospheric pressure and increased temperatures. Reduced areas are achieved by using narrow vessels, and passageway 20 insures that the gas will be collected at atmospheric pressure.

Considering in greater detail application of the present apparatus to the testing for volumes of carbonation of carbonated beverages, it has been found that by using the following procedure consistently accurate and reliable results may be obtained. First, vessel 10 is completely filled with tap water at room temperature and the stopper is inserted into the open end thereof with conduit 16 extending into the vessel. In this regard it has been found that this temperature is not only easy to determine without using a thermometer, but it is great enough that there will be so little absorption of the $CO_2$ into the displaceable water during the time required for making a test that it can be considered as having no effect on the accuracy thereof. Vessel 12 is then completely filled with a sample of the carbonated beverage to be tested and is held in an upright position while vessel 10, with the stopper in place, is quickly inverted and the small end of the stopper inserted into the open end of vessel 12. While the assembled apparatus is maintained in this upright or nearly upright position, heat is applied to vessel 12 by holding it in water in a pan or from a tap at a temperature of approximately 115° F., until no further increase in the amount of gas collected is observed. This temperature has been found to be particularly satisfactory since it will result in the liberation of sufficient gas for accurate results, and yet is easily determined (approximately) without the use of a thermometer since this is the approximate temperature of water at which it becomes uncomfortable to immerse one's hand therein. Because of this fact it has been found that one can consistently arrive at this temperature. If the above-described technique for correcting volume calibrations has been used the amount of gas retained in the test sample will be the correct amount for which the graduations are compensated. Therefore, the coefficient of absorption, or volumes of carbonation, may then be read directly by holding the apparatus in a vertical position (as in FIGURE 2) and noting the level of the displaceable liquid in chamber 22 with respect to the graduations. It is not necessary to shake the sample to increase liberation of the gas. Such a test may be conducted in the order of two to three minutes.

It is quite important that the apparatus be initially clean if accurate results are desired. To maintain cleanliness after a test has been conducted and the apparatus cleaned, the components may be reassembled in the manner shown in FIGURE 4. When so arranged the interior of vessels 10 and 12, as well as conduit 16, are fully enclosed and thus protected from contamination. This feature is very helpful in field use where the apparatus would otherwise be subject to contamination when not used.

As can be appreciated, the apparatus of the present invention is ideally suited for field use since it is rugged in construction, having no thermometers or pressure gauges, and since it is direct-reading without the use of a chart. For example, service men may use the present apparatus for conducting spot checks on the carbonation of soda fountains, vending machines, and the like to insure the proper standards of carbonation are being maintained. The apparatus and its method of operation are such that sufficient accuracy is obtained for general field use of this character. However, in the event even greater accuracy is desired, the apparatus may be provided a thermometer to maintain the va[illegible] within closer limits.

Thus, there is disclosed in the above description and in the drawings an exemplary embodiment of the invention which fully and effectively accomplishes the objects thereof. However, it will be apparent that variations in the details of construction may be indulged in without departing from the sphere of the invention herein described, or the scope of the appended claims.

What is claimed is:

1. A test apparatus of the type described comprising: a first elongated open-ended vessel adapted to contain a test sample of liquid containing a gas in solution; a second elongated open-ended vessel for collecting gas liberated from the test sample, said second vessel being adapted to contain a displaceable liquid above which liberated gas may be collected; a stopper adapted to sealingly engage the open ends of each of said vessels to maintain them in an oppositely disposed substantially coaxial relationship; conduit means for communicating liberated gas from the end of said first vessel adjacent the open end thereof to the end of said second vessel adjacent the closed end thereof, said conduit means extending through said stopper; and means defining a passageway extending between said second vessel and atmosphere when said apparatus is assembled for operation, said passageway being of sufficiently small diameter to prevent the escape of the displaceable liquid due solely to the action of gravity when the liquid is at atmospheric pressure.

2. A test apparatus of the type described comprising: a first elongated open-ended vessel adapted to contain a test sample of liquid containing a gas in solution; a second elongated open-ended vessel for collecting gas liberated from the test sample, said second vessel being adapted to contain a displaceable liquid above which liberated gas may be collected; a stopper adapted to sealing engage the open ends of each of said vessels to maintain them in an oppositely disposed substantially coaxial relationship; conduit means for communicating liberated gas from the end of said first vessel adjacent the open end thereof to the end of said second vessel adjacent the closed end thereof; and means defining a passageway extending between said second vessel and atmosphere when said apparatus is assembled for operation, said first vessel being shorter and of a smaller diameter than said second vessel so that it may be stored therein when the apparatus is not assembled for operation, said passageway being of sufficiently small diameter to prevent the escape of the displaceable liquid due solely to the action of gravity when the liquid is at atmospheric pressure.

3. Test apparatus as claimed in claim 2, wherein said conduit means is smaller in outside diameter than the inside diameter of said first vessel.

4. A test apparatus of the type described comprising: a first elongated open-ended vessel adapted to contain a test sample of liquid containing a gas in solution, said first vessel being provided adjacent the closed end thereof with a roughened surface for increasing the rate of liberation of gas from the test sample therein; a second elongated open-ended vessel for collecting gas liberated from the test sample, said second vessel being adapted to contain a displaceable liquid above which liberated gas may be collected; a stopper adapted to sealingly engage the open ends of each of said vessels to maintain them in an oppositely disposed substantially coaxial relationship; conduit means for communicating liberated gas from the end of said first vessel adjacent the open end thereof to the end of said second vessel adjacent the closed end thereof; and means defining a passageway extending between said second vessel and atmosphere when said apparatus is assembled for operation, said passageway being of sufficiently small diameter to prevent the escape of the displaceable liquid due solely to the action of gravity when the liquid is at atmospheric pressure.

5. A test apparatus of the type described comprising: a first elongated open-ended vessel adapted to contain a test sample of liquid containing a gas in solution; a second elongated open-ended vessel for collecting gas liberated from the test sample, said second vessel being adapted to contain a displaceable liquid above which liberated gas may be collected; a stopper adapted to frictionally and sealing engage the open ends of each of said vessels to maintain them in an oppositely disposed substantially coaxial relationship; conduit means for communicating liberated gas from the end of said first vessel adjacent the open end thereof to the end of said second vessel adjacent the closed end thereof; and means defining a passageway in said stopper extending between said second vessel and atmosphere when said apparatus is assembled for operation, said passageway being of sufficiently small diameter to prevent the escape of the displaceable liquid due solely to the action of gravity when the liquid is at atmospheric pressure.

6. A test apparatus of the type described comprising: a first elongated open-ended vessel adapted to contain a test sample of liquid containing a gas in solution; a second elongated open-ended vessel for collecting gas liberated from the test sample, said second vessel being adapted to contain a displaceable liquid above which liberated gas may be collected; a stopper adapted to frictionally and sealingly engage the open ends of each of said vessels to maintain them in an oppositely disposed substantially coaxial relationship; conduit means for communicating liberated gas from the end of said first vessel adjacent the open end thereof to the end of said second vessel adjacent the closed end thereof; and a means defining a passageway in said stopper extending between said second vessel and atmosphere when said apparatus is assembled for operation, said first vessel being shorter and of a smaller diameter than said second vessel so that it may be stored therein when the apparatus is not assembled for operation, said passageway being of sufficiently small diameter to prevent the escape of the displaceable liquid due solely to the action of gravity when the liquid is at atmospheric pressure.

7. A test apparatus of the type described comprising: a first elongated open-ended vessel adapted to contain a test sample of liquid containing a gas in solution, a second elongated open-ended vessel for collecting gas liberated from the test sample, said second vessel being adapted to contain a displaceable liquid above which liberated gas may be collected; a stopper adapted to frictionally and sealingly engage the open ends of each of said vessels to maintain them in an oppositely disposed substantially coaxial relationship; conduit means for communicating liberated gas from the end of said first vessel adjacent the open end thereof to the end of said second vessel adjacent the closed end thereof; and means defining a passageway extending between said second vessel and atmosphere when said apparatus is assembled for operation, said passageway being of sufficiently small diameter to prevent the escape of the displaceable liquid due solely to the action of gravity when the liquid is at atmospheric pressure.

References Cited by the Examiner

Ehret: "Smith's College Chemistry," published by Appleton-Century (New York), 1942. Page 43 relied on.

RICHARD C. QUEISSER, *Primary Examiner.*

JOSEPH P. STRIZAK, ROBERT L. EVANS, *Examiners.*

UNITED STATES PATENT OFFICE
CERTIFICATE OF CORRECTION

Patent No. 3,182,487

May 11, 1965

Frank O. Graham

It is hereby certified that error appears in the above numbered patent requiring correction and that the said Letters Patent should read as corrected below.

Column 2, line 69, for "orginally" read -- originally --; column 3, line 43, after "tested" insert -- at a pressure --; column 5, line 35 and column 6, line 10, for "sealing", each occurrence, read -- sealingly --.

Signed and sealed this 14th day of September 1965.

(SEAL)
Attest:

ERNEST W. SWIDER
Attesting Officer

EDWARD J. BRENNER
Commissioner of Patents